United States Patent
Vanka et al.

(10) Patent No.: US 9,959,075 B2
(45) Date of Patent: May 1, 2018

(54) SYSTEM AND METHOD FOR FLUSH POWER AWARE LOW POWER MODE CONTROL IN A PORTABLE COMPUTING DEVICE

(71) Applicant: QUALCOMM INCORPORATED, San Diego, CA (US)

(72) Inventors: Krishna Vsssr Vanka, Hyderabad (IN); Narasimhan Agaram, Hyderabad (IN); Sravan Kumar Ambapuram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/234,025

(22) Filed: Aug. 11, 2016

(65) Prior Publication Data
US 2017/0038999 A1    Feb. 9, 2017

Related U.S. Application Data

(63) Continuation-in-part of application No. 14/819,384, filed on Aug. 5, 2015.

(51) Int. Cl.
*G06F 1/32* (2006.01)
*G06F 3/06* (2006.01)
(Continued)

(52) U.S. Cl.
CPC .......... *G06F 3/0653* (2013.01); *G06F 1/3206* (2013.01); *G06F 1/3243* (2013.01);
(Continued)

(58) Field of Classification Search
CPC ........ G06F 1/32; G06F 1/3206; G06F 1/3243; G06F 1/3275; G06F 1/3225;
(Continued)

(56) References Cited

U.S. PATENT DOCUMENTS 7,055,007 B2    5/2006    Flautner et al.
7,647,452 B1    1/2010    Moll et al.
(Continued)

FOREIGN PATENT DOCUMENTS

EP    2664977 A2    11/2013

OTHER PUBLICATIONS

Dani A.M., et al., "Towards a Scalable Working Set Size Estimation Method and Its Application for Chip Multiprocessors," IEEE Transactions on Computers, Dec. 10, 2012, vol. 63 (6), pp. 1-14.
(Continued)

*Primary Examiner* — Fahmida Rahman
(74) *Attorney, Agent, or Firm* — Smith Tempel Blaha LLC

(57) ABSTRACT

Systems and methods for improved implementation of low power modes in a multi-core system-on-a-chip (SoC) are presented. A cache memory of the multi-core SoC not being accessed by other components of the SoC is identified and a number of dirty cache lines present in the cache memory is determined. For a low power mode of the core, an entry latency based on the number of dirty cache lines is determined, and an exit latency is determined. An entry power cost for the low power mode is also determined based on the number of dirty cache lines A determination is made whether the low power mode for the cache memory results in a power savings over an active mode for the cache memory based at least on the entry power cost and the entry latency of the cache memory entering the first power mode.

22 Claims, 8 Drawing Sheets

(51) Int. Cl.
*G06F 12/0804* (2016.01)
*G06F 12/0893* (2016.01)

(52) U.S. Cl.
CPC .......... *G06F 1/3275* (2013.01); *G06F 3/0625* (2013.01); *G06F 3/0683* (2013.01); *G06F 12/0804* (2013.01); *G06F 12/0893* (2013.01); *G06F 2212/1028* (2013.01); *G06F 2212/60* (2013.01); *Y02B 60/1225* (2013.01); *Y02B 60/1228* (2013.01); *Y02B 60/1239* (2013.01)

(58) Field of Classification Search
CPC .... G06F 3/0625; G06F 3/0653; G06F 3/0683; G06F 12/0804; G06F 12/0893; G06F 2212/1028; G06F 2212/60; Y02B 60/1225; Y02B 60/1228; Y02B 60/1239
See application file for complete search history.

(56) References Cited

U.S. PATENT DOCUMENTS

| | | | |
|---|---|---|---|
| 7,805,575 B1 | 9/2010 | Agarwal et al. | |
| 8,271,737 B2 | 9/2012 | Chen et al. | |
| 8,291,168 B2 | 10/2012 | Wilkerson et al. | |
| 9,176,875 B2 | 11/2015 | Wang et al. | |
| 2005/0254519 A1* | 11/2005 | Beukema | G06F 13/4208 370/468 |
| 2010/0169683 A1 | 7/2010 | Wang et al. | |
| 2012/0166731 A1* | 6/2012 | Maciocco | G06F 1/3275 711/130 |
| 2014/0281602 A1 | 9/2014 | Keppel et al. | |
| 2014/0304475 A1 | 10/2014 | Ramanujan et al. | |
| 2015/0268711 A1 | 9/2015 | Ramani et al. | |
| 2015/0269067 A1 | 9/2015 | Pendharkar et al. | |
| 2017/0038813 A1 | 2/2017 | Vanka et al. | |

OTHER PUBLICATIONS

International Search Report and Written Opinion—PCT/US2016/041703—ISA/EPO—dated Oct. 7, 2016 (152915WO).

Mittal S., "A Survey of Architectural Techniques for Improving Cache Power Efficiency," HAL archives-ouvertes, Jan. 13, 2015, pp. 1-13.

* cited by examiner

SYSTEM AND METHOD FOR FLUSH POWER AWARE LOW POWER MODE CONTROL IN A PORTABLE COMPUTING DEVICE

CROSS-REFERENCE TO RELATED APPLICATION

This application is a continuation-in-part application of and claims the benefit of the priority under 35 U.S.C. § 120 to U.S. Non-Provisional patent application Ser. No. 14/819,384 entitled "System And Method For Cache Aware Low Power Mode Control In A Portable Computing Device" and filed on Aug. 5, 2015, which is hereby incorporated by reference in its entirety.

DESCRIPTION OF THE RELATED ART

Mobile devices with a processor that communicate with other devices through a variety of communication media, including wireless signals, are ubiquitous. Mobile devices including portable computing devices (PCDs) may be used to communicate with a variety of other devices via wireless, analog, digital and other means. These mobile devices may include mobile phones, portable digital assistants (PDAs), portable game consoles, palmtop computers, tablet computers and other portable electronic devices. In addition to the primary function, PCDs may also be used for downloading and playing games; downloading and playing music; downloading and viewing video; global positioning system (GPS) navigation, web browsing, and running applications.

To accommodate increased functionality, modern PCDs typically include multiple processors or cores (e.g., central processing unit(s) (CPUs)) with associated cache memories for controlling or performing varying functions of the PCD in parallel, such as in multiple parallel threads. Keeping multiple cores active results in large energy consumption, reducing battery life in a PCD. As a result, many PCDs place one or more core in a lower power mode if the core is idle or not actively executing a task.

Decisions about placing a core and/or a cache associated with the core into a low power mode may be made with an algorithm or other logic. Limiting factors on the decision whether place a core or cache into the low power mode include the time and/or energy overhead associated with taking the core or cache to the low power state and then reactivating the core or cache out of the low power state. These factors are typically pre-determined and unchanging, and do not take into consideration the current operating state of the core or the operating state of the cache memory.

Thus, there is a need for systems and methods for improved implementation of low power modes for cores and/or caches based on the operating state, and in particular the operating state of the cache memory associated with the cores/CPUs when determining whether to enter a low power mode.

SUMMARY OF THE DISCLOSURE

Systems and methods are disclosed that allow for improved implementation of low power modes for caches in a portable computing device (PCD) based on the operating state of the cache memory. In operation, an exemplary method identifies a cache memory of the multi-core SoC not being accessed. A number of dirty cache lines present in the cache memory is determined. For a low power mode of the cache, an entry latency of placing the cache memory into the low power mode based on the number of dirty cache lines, and an exit latency of taking the cache memory out of the low power mode is determined. An entry power cost of placing the cache memory into the low power mode based on the number of dirty cache lines, and an exit power cost of taking the cache memory out of the low power mode is also determined. Finally, a determination is made whether the low power mode for the cache memory results in a power savings over an active mode for the cache memory based at least on the entry power cost of the cache memory and the entry latency for the cache memory to enter the low power mode.

Another example embodiment is a computer system for a multi-core system-on-a-chip (SoC) in a portable computing device (PCD), the system comprising a cache memory of the SoC and a low power mode controller in communication with the cache via an interconnect. The low power mode controller is configured to identify that the cache memory is not being accessed by another component of the SoC and determined for the cache memory a number of dirty cache lines. The low power mode controller is further configured to determine an entry latency of placing the cache memory into the low power mode based on the number of dirty cache lines, and an exit latency of taking the cache memory out of the low power mode.

The low power mode controller is also configured to determine for the low power mode of the cache memory, an entry power cost of placing the cache memory into the low power mode based on the number of dirty cache lines, and an exit power cost of taking the cache memory out of the low power mode. Finally, the low power mode controller is configured to determine if the low power mode for the cache memory results in a power savings over an active mode for the cache memory based at least on the entry power cost of the cache memory and the entry latency for the cache memory to enter the low power mode.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures. Similarly, for reference numerals with designations, such as 102', the designation may designate an alternative embodiment for the underlying element with the same reference numerals (but without the designation).

DETAILED DESCRIPTION

Figure 1:
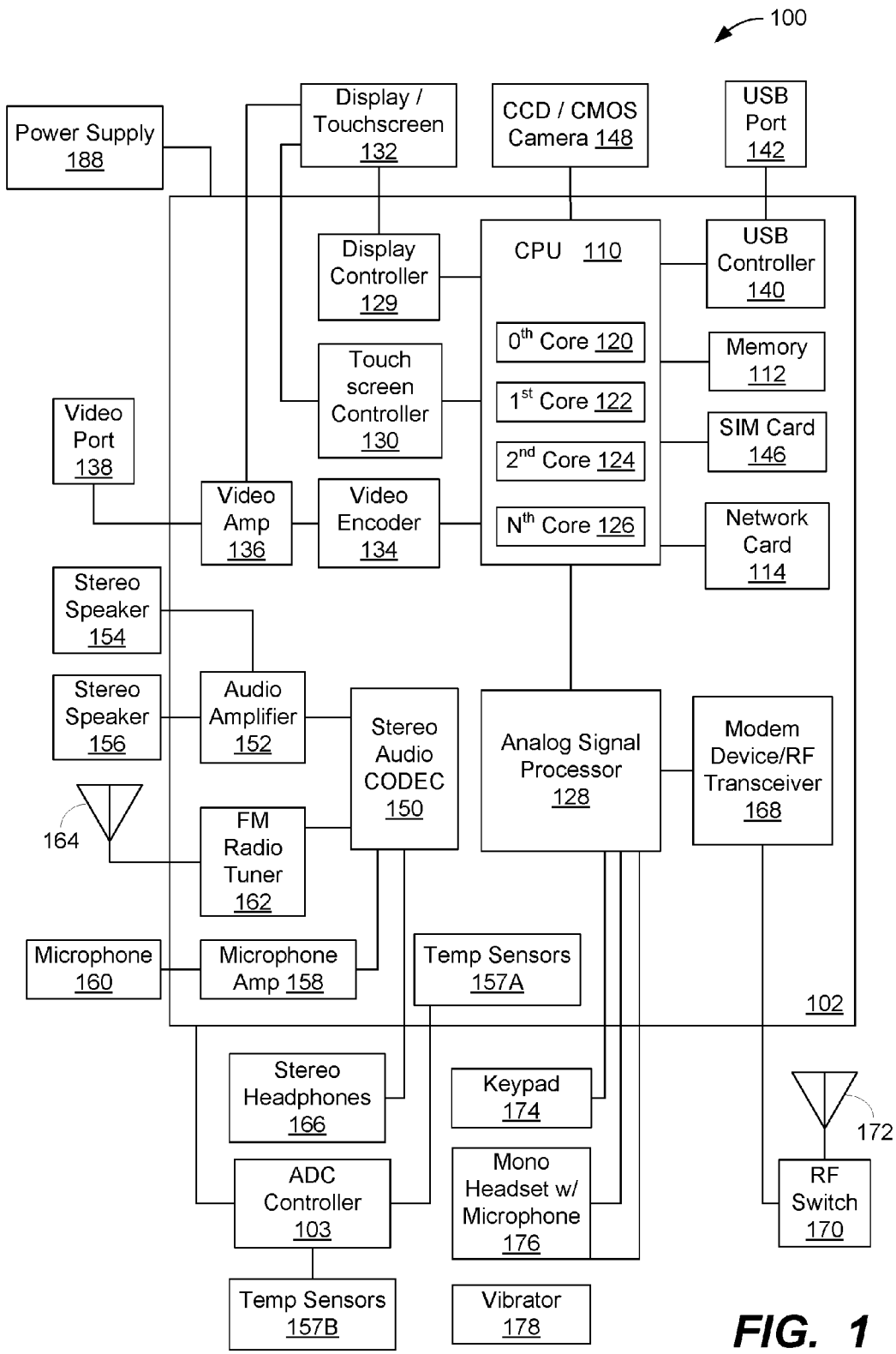
FIG. 1 is a block diagram of an example embodiment of a portable computing device (PCD) in which the improved implementation of low power modes for caches in a portable computing device (PCD) of the present disclosure may be implemented.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

In this description, the terms "central processing unit ("CPU")," "digital signal processor ("DSP")," "graphics processing unit ("GPU")," "chip," "video codec," "system bus," "image processor," and "media display processor ("MDP")" are non-limiting examples of processing components that may be implemented on an SoC. These terms for processing components are used interchangeably except when otherwise indicated. Moreover, as discussed below, any of the above or their equivalents may be implemented in, or comprised of, one or more distinct processing components generally referred to herein as "core(s)" and/or "sub-core(s)."

In this description, the terms "workload," "process load," "process workload," and "graphical workload" may be used interchangeably and generally directed toward the processing burden, or percentage of processing burden, that is associated with, or may be assigned to, a given processing component in a given embodiment. Additionally, the related terms "frame," "code block" and "block of code" may be used interchangeably to refer to a portion or segment of a given workload. Further to that which is defined above, a "processing component" or the like may be, but is not limited to being, a central processing unit, a graphical processing unit, a core, a main core, a sub-core, a processing area, a hardware engine, etc. or any component residing within, or external to, an integrated circuit within a portable computing device.

One of ordinary skill in the art will recognize that the term "MIPS" represents the number of millions of instructions per second a processor is able to process at a given power frequency. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating or processing capacity. Additionally, as would be understood by one of ordinary skill in the art, a processor's MIPS setting directly correlates with the power, frequency, or operating frequency, being supplied to the processor.

The present systems and methods for improved implementation of low power modes for caches based on the operating state in a PCD provide a cost effective way to dynamically implement improved decision making as to which low power mode to enter an idle cache into, or whether to enter the idle cache into a low power mode at all. In an embodiment, the present systems and methods consider the impact of the operating state of the cache prior to the core/CPU entering the idle state when making determinations about the "costs" or "overhead" of entering the core/CPU into a low power mode, and in particular the "costs" or "overhead" in terms of time, power, etc., associated with flushing a cache and/or writing "dirty" lines stored in a cache to another memory of the PCD prior to the cache entering the low power state.

The systems described herein, or portions of the system, may be implemented in hardware or software as desired. If implemented in hardware, the devices can include any, or a combination of, the following technologies, which are all well known in the art: discrete electronic components, an integrated circuit, an application-specific integrated circuit having appropriately configured semiconductor devices and resistive elements, etc. Any of these hardware devices, whether acting or alone, with other devices, or other components such as a memory may also form or comprise components or means for performing various operations or steps of the disclosed methods.

When a system described herein is implemented, or partially implemented, in software, the software portion can be used to perform various steps of the methods described herein. The software and data used in representing various elements can be stored in a memory and executed by a suitable instruction execution system (microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions.

FIG. 1 is a block diagram of an exemplary, non-limiting aspect of a PCD 100 that may implement the systems and methods described herein. The PCD 100 illustrated in FIG. 1 is in the form of a wireless telephone capable of communicating with one or more wireless communication system. Such wireless communication system may be a broadband wireless communication system, including a Long Term Evolution (LTE) system, a Code Division Multiple Access (CDMA) system, a Frequency Division Multiple Access (FDMA) system, a Global System for Mobile Communications (GSM) system, a wireless local area network (WLAN) system, some other wireless system, or a combination of any of these. A CDMA system may implement Wideband CDMA (WCDMA), CDMA 1X, Evolution-Data Optimized (EVDO), Time Division Synchronous CDMA (TD-SCDMA), or some other version of CDMA.

As shown, the PCD 100 includes an on-chip system (or SoC) 102 that includes a heterogeneous multi-core central processing unit ("CPU") 110 and an analog signal processor 128 that are coupled together. The CPU 110 may comprise a zeroth core 120, a first core 122, second core 124, and an Nth core 126 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 120, 122, 124, 126 may have different architectures, may process workloads at different efficiencies, may consume different amounts of power when operating, etc. Each of the cores 120, 122, 124, 126 may control one or more function of the PCD 100. For example, the zeroth core 120 may be a graphics processing unit ("GPU") for controlling graphics in the PCD 100. Such GPU/zeroth core 120 may further include drivers, cache(s), and/or other components necessary to control the graphics in the PCD 100, including controlling communications between the GPU core 120 and memory 112 (including buffers). For another example, a different core such as the Nth core 126 may run the PCD operating system, which may be a high-level operating system ("HLOS"). Such Nth/HLOS core 126 may further include drivers, cache(s), hardware interfaces, and/or other components necessary to run the HLOS, including communications between the core 126 and memory 112 (which may include flash memory).

Any of the cores 120, 122, 124, 126 may be a separate processor such as a CPU or a digital signal processor. One or more of the cores 120, 122, 124, 126 may include, in addition to a processor, other components such as one or more cache memories. These cache memories may include a dedicated cache memory for a particular core or processor, such as for example an L1 cache. Additionally, or alternatively these cache memories may include a cache memory that is shared with and/or accessible by other cores or processors, such as for example an L2 cache.

Additionally, each of the cores 120, 122, 124, 126 may be functionally grouped together with other components, such as memory 112, sensors, or other hardware of the PCD 100 to form a subsystem as described below. Such subsystem(s) may be implemented in order to perform certain functionality of the PCD, such as an audio subsystem, a GPS subsystem, a sensor subsystem, etc. One or more of such subsystems may also be configured to operate independently of the SoC 102, such as to continue operation when the SoC 102 has been placed into a low or reduced power state or mode, including a power off state or mode.

As mentioned, a memory 112 is illustrated as coupled to the multicore CPU 110 in FIG. 1. This memory 112 may for example be random access memory ("RAM"), read only memory ("ROM"), flash memory, or any combination thereof Additionally, the memory 112 may comprise multiple different types of memory located together or located remotely from each other, including buffers, main memories, and caches. Such caches could include one or more L2, L3, LN caches that may be accessed by one or more of the cores 120, 122, 124, 126. Additionally, although the memory 112 is illustrated as located on the SoC 102, the memory 112 may include one or more memories located physically remote from the SoC 102 or "off-chip," such as a Double Data Rate ("DDR") memory in communication with the multicore CPU 110 and/or one or more of the cores 120, 122, 124, 126.

As illustrated in FIG. 1, a display controller 129 and a touch screen controller 130 are coupled to the multicore CPU 110. In turn, a display/touchscreen 132, external to the on-chip system 102, is coupled to the display controller 129 and the touch screen controller 130. A digital camera 148 may also be coupled to the multicore CPU 110. In such embodiments, the digital camera 148 may be controlled by one of the cores 120, 122, 124, 126 of the multicore CPU 110. In an exemplary aspect, the digital camera 148 is a charge-coupled device ("CCD") camera or a complementary metal-oxide semiconductor ("CMOS") camera The PCD 100 of FIG. 1 may further include a video encoder 134, e.g., a phase alternating line ("PAL") encoder, a sequential couleur a memoire ("SECAM") encoder, or a national television system(s) committee ("NTSC") encoder, or any other type of video decoder 134 coupled to the multicore CPU 110. Further, a video amplifier 136 is coupled to the video encoder 134 and the display/touchscreen 132. A video port 138 is coupled to the video amplifier 136. As depicted in FIG. 1, a universal serial bus ("USB") controller 140 is coupled to the multicore CPU 110. Also, a USB port 142 is coupled to the USB controller 140. A subscriber identity module ("SIM") card 146 may also be coupled to the multicore CPU 110. In other embodiments, multiple SIM cards 146 may be implemented.

As further illustrated in FIG. 1, a stereo audio CODEC 150 may be coupled to the multicore CPU 110. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, a FM antenna 164 is coupled to the FM radio tuner 162. Further, stereo headphones 166 may be coupled to the stereo audio CODEC 150.

FIG. 1 further indicates that a modem device/radio frequency ("RF") transceiver 168 may be coupled to the multicore CPU 110. The modem device 168 may support one or more of the wireless communications protocols, such as GSM, CDMA, W-CDMA, TDSCDMA, LTE, and variations of LTE such as, but not limited to, FDB/LTE and PDD/LTE wireless protocols. Additionally, there may be multiple modem devices 168, and in such embodiments, different modem devices 168 may support come or all of the wireless communication protocols and/or technologies listed above.

In some implementations the modem device 168 may be further comprised of various components, including a separate processor, memory, and/or RF transceiver. In other implementations the modem device 168 may simply be an RF transceiver. Further, the modem device 168 may be incorporated in an integrated circuit. That is, the components comprising the modem device 168 may be a full solution in a chip and include its own processor and/or core that may be monitored by the systems and methods described herein. Alternatively, various components comprising the modem device 168 may be coupled to the multicore CPU 110 and controlled by one of the cores 120, 122, 124 of the CUP 110. An RF switch 170 may be coupled to the modem device 168 and an RF antenna 172. In various embodiments, there may be multiple RF antennas 172, and each such RF antenna 172 may be coupled to the modem device 168 through an RF switch 170.

As shown in FIG. 1, a keypad 174 may be coupled to the multicore CPU 110 either directly, or through the analog signal processor 128. Also, a mono headset with a microphone 176 may be coupled to the multicore CPU 110 and or analog signal processor 128. Further, a vibrator device 178 may also be coupled to the multicore CPU 110 and/or analog signal processor 128. FIG. 1 also shows that a power supply 188 may be coupled to the on-chip system 102, and in some implementations the power supply 188 is coupled via the USB controller 140. In a particular aspect, the power supply 188 is a direct current (DC) power supply that provides power to the various components of the PCD 100 that require power. Further, in a particular aspect, the power supply 188 may be a rechargeable DC battery or a DC power supply that is derived from an alternating current (AC) to DC transformer that is connected to an AC power source.

The multicore CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103. However, other types of thermal sensors 157 may be employed without departing from the scope of the disclosure.

FIG. 1 further indicates that the PCD 110 may also include a network card 114 that may be used to access a data network, e.g., a local area network, a personal area network, or any other network. The network card 114 may be a Bluetooth network card, a WiFi network card, a personal area network ("PAN") card, or any other network card well known in the art. Further, the network card 114 may be incorporated in an integrated circuit. That is, the network card 114 may be a full solution in a chip, and may not be a separate network card 114.

As depicted in FIG. 1, the display/touchscreen 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the SoC 102.

The SoC 102 may also include various buses and/or interconnects (not shown) to communicatively couple the multicore CPU 110 and/or one or more of the cores 120, 122, 124, 126 with other subsystems or components of the SoC 102 or PCD 100. It should be understood that any number of bus and/or interconnect controllers may also be implemented and arranged to monitor a bus/interconnect interface in the on-chip system 102. Alternatively, a single bus/interconnect controller could be configured with inputs arranged to monitor two or more bus/interconnect interfaces that communicate signals between CPU 110 and various subsystems or components of the PCD 100 as may be desired.

One or more of the method steps described herein may be enabled via a combination of data and processor instructions stored in the memory 112 and/or a memory located on the CPU 110. These instructions may be executed by one or more cores 120, 122, 124, 126 in the multicore CPU 110 and/or subsystems of the SoC 102 in order to perform the methods described herein. Further, the multicore CPU 110, one or more of the cores 120, 122, 124, 126, the memory 112, other components of the PCD 100, or a combination thereof may serve as a means for executing one or more of the method steps described herein in order enable improved implementation of low power modes for cores/CPUs based on the operating state, and in particular the operating state of one or more cache memories associated with the cores/CPUs modes.

Figure 2:
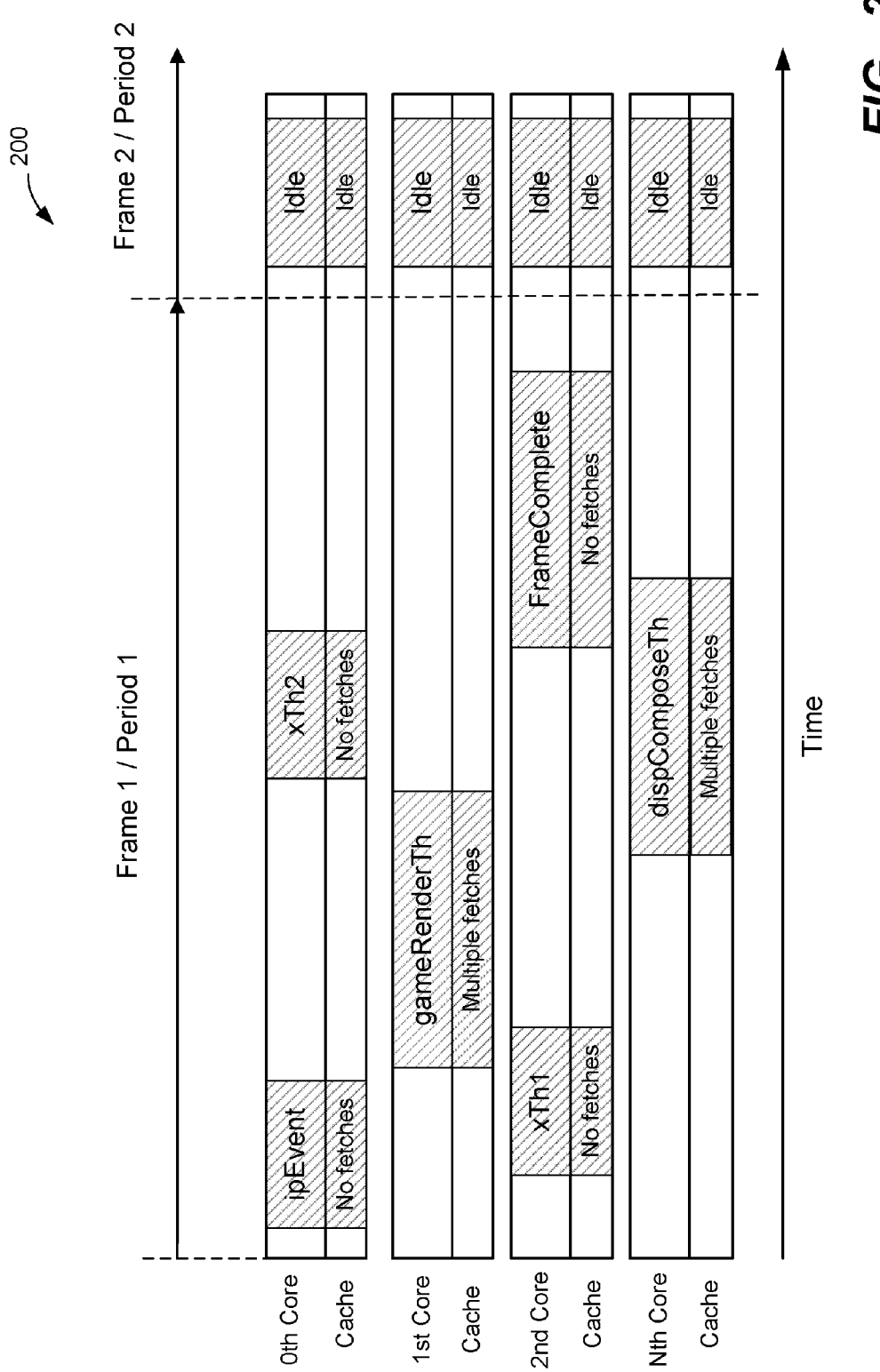
FIG. 2 is an exemplary timing diagram of the execution of parallel threads in a PCD, such as the PCD embodiment illustrated in FIG. 1.

FIG. 2 is an exemplary timing diagram of the execution of parallel threads in a PCD, such as by cores 120, 122, 124, 126 of the PCD embodiment illustrated in FIG. 1. As illustrated in FIG. 2, during operation cores 120, 122, 124, 126 may perform various tasks in parallel over a particular time period. The time periods may be generated, or measured in accordance with any periodic signal received by the multi-core CPU 110 (FIG. 1). For example, the periodic signal may be for example a clock signal, a periodic interrupt, a vertical synchronization ("V-Sync") signal, etc., in differing embodiments. In the exemplary timing diagram of FIG. 2, the cores 120, 122, 124, 126 are executing a game on the PCD 100. In this example the time periods are in accordance with a V-Sync signal. However one of ordinary skill would understand that FIG. 2 also applies to other signals and/or use cases, such as for example video playback, operating teleconferencing or video conferencing software, etc.

FIG. 2 shows a first time period, Frame 1/Period 1, and a portion of a second time period, Frame 2/Period 2. As illustrated in FIG. 2, all of 0th core 120, 1st core 122, 2nd core 124 and Nth core 126 are active in Frame 1. As would be understood by one of skill in the art, although all of cores 120, 122, 124, 126 are active during Frame 1, the level or amount of activity is not necessarily equally distributed between the cores 120, 122, 124, 126. For example, as illustrated in FIG. 2 the 0th Core 120 thread executes two, relatively smaller tasks, ipEvent and xTh2 during Frame 1.

The 1st Core 122 thread executes one, relatively larger task, gameRenderTh during Frame 1.

As would also be understood by one of skill in the art, the different tasks executed by each thread may require different activity levels for one or more cache associated with the cores 120, 122, 124, 126 executing the threads. Using the 0th Core as an example again, as illustrated in FIG. 2, the two tasks executed during Frame 1 require little activity by the cache associated with the 0th Core. This cache associated with the 0th Core may be an L1 cache, an L2 cache, or any other cache to which the 0th Core has access. In FIG. 2, this lack of activity by the 0th Core's cache is represented by the cache requiring no fetches of content to write into the cache, such as fetches from a different cache, an off-chip memory like a DDR, a DVD disk, or a remote server over a network connection.

Continuing with the example, as illustrated in FIG. 2, the single task of the thread executed by the 1st Core requires a relatively large activity level by the cache associated with the 1st Core. This large activity level by the 1st Core's cache is represented in FIG. 2 by the cache requiring multiple fetches of content from external sources, resulting in the fetched content being written as one or more cache lines in the cache. Such content fetches may include retrieving content from a different cache, an off-chip memory like a DDR, a DVD disk, or a remote server over a network connection for example.

As also illustrated in FIG. 2, after the completion of Frame 1/Period 1, none of cores 120, 122, 124, 126 have any threads or tasks to execute in Frame 2/Period 2. As a result cores 120, 122, 124, 126 and their respective caches will enter an idle state for at least Frame 2/Period 2. In other examples, one or more of cores 120, 122, 124, 126 may remain active during Frame 2/Period 2 while the remaining cores 120, 122, 124, 126 enter the idle state. When the PCD 100 detects that a core/CPU is entering an idle state, such as in Frame 2/Period 2 illustrated in FIG. 2, the PCD 100 may try and place the core/CPU and/or its associated cache into a low power mode, to reduce the power consumption of the core/CPU as well as the power consumption of the cache. As used herein, "low power mode" or "LPM" may include one or more modes or states of a core/CPU and/or cache, such as a non-functional state, sleep state, reduced or zero-voltage state, reduced or zero-power state, etc., in which the core/CPU or cache consumes or leaks less power than the core/CPU or cache consumes or leaks while in a fully active state.

Note that although the caches in FIG. 2 are illustrated as dedicated caches—i.e. each single cache accessible by only one of cores 120, 122, 124, 126, other embodiments of the caches are possible and within the scope of this disclosure. For example, one or more of the cache(s) illustrated in FIG. 2 may instead by L2 or other caches that are shared by more than one of the cores 120, 122, 124, 126 and/or by other components of the PCD not illustrated in FIG. 2. The systems and methods of the present disclosure are equally applicable to caches that are not dedicated to any core or CPU. and/or.

Additionally, the decisions or determinations to enter a cache into a low power mode or state for the systems and methods of this disclosure may be made independently of whether any core/CPU is entered into a low power mode or state. As an example, in the embodiment illustrated in FIG. 2, the decision may be made to enter the 1st Core 122 into a low power mode. However, the determination may be separately or independently made to not place the cache associated with the 1st Core into a low power mode and/or to place the cache into a different low power mode than the 1st Core 122. This separate or independent determination for the cache may be based on the amount of data present in the cache associated with the 1st Core 122. In an embodiment, this determination may be based on the amount or number of "dirty" cache lines in the cache and the associated "costs" or "overheads" associated with flushing these "dirty" cache lines from the cache before the cache will be allowed to enter into the low power mode or state.

Figure 3A:
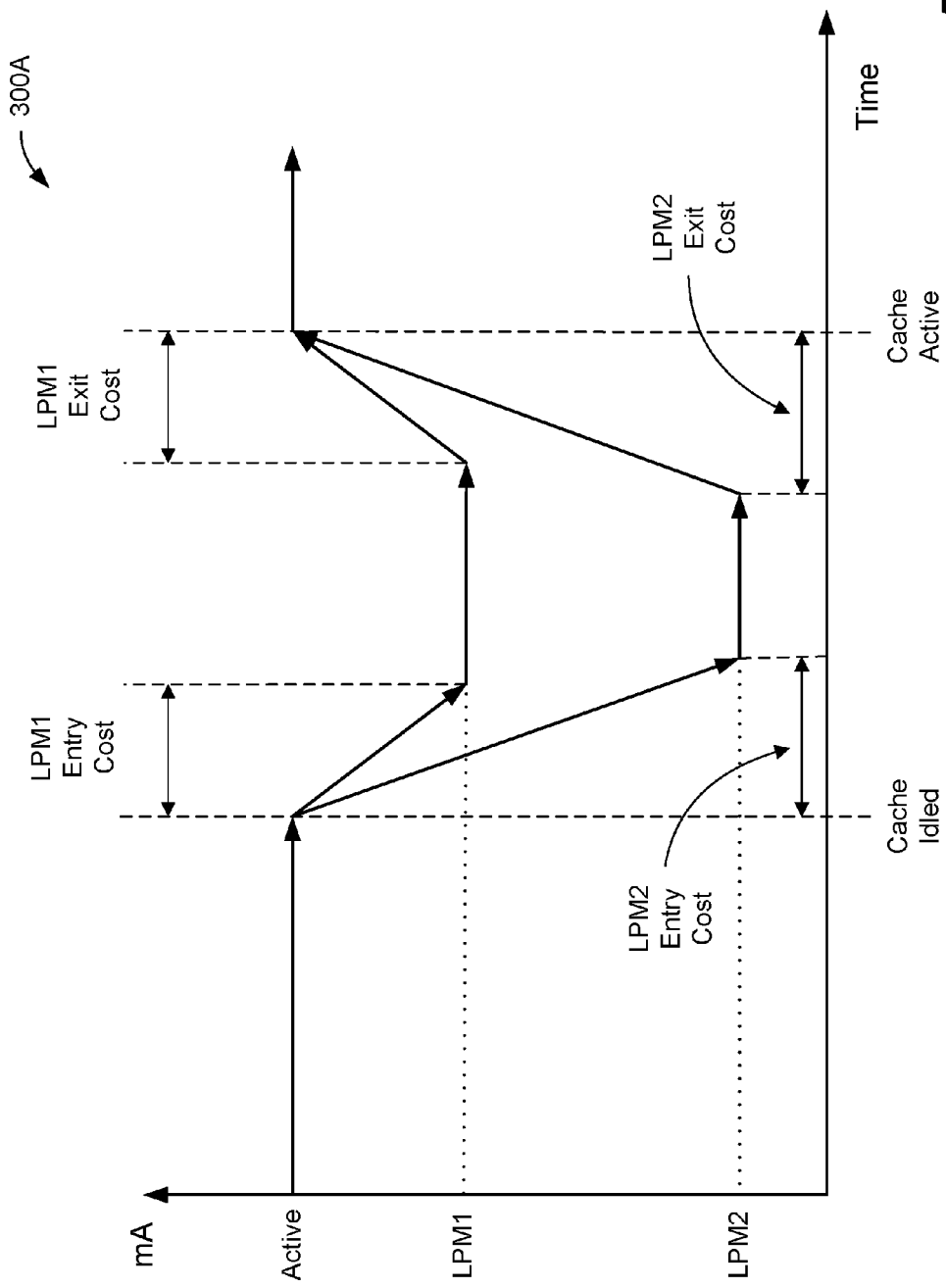
FIG. 3A is a graph illustrating exemplary low power modes for a cache, such as a cache associated with one of the cores of the PCD embodiment illustrated in FIG. 1.

FIG. 3A is a graph 300A illustrating exemplary low power modes that a cache, such as one or more of the caches associated with cores 120, 122, 124, 126 (see FIG. 2) may be placed into when the cache or a component associated with the cache is detected as being idle. In the graph 300A of FIG. 3A, the x-axis represents time and the y-axis represents the power in milliamperes ("mA") consumed or leaked by the exemplary cache. As would be understood, the graph 300A of FIG. 3A may vary for different caches depending on the system, the number of low power modes for the cache, the system or cache architecture, the implementation, etc.

In the example of FIG. 3A, the cache has an Active state and two low power modes, LPM1 and LPM 2. As also illustrated in FIG. 3A, at a point in time labeled Cache Idled, the exemplary cache enters an idle state (see Frame 2 of FIG. 2). When in the idle state, the cache may be left in Active mode, or may be placed into one of the low power modes LPM1 or LPM2 illustrated in FIG. 3A. If placed in one of the low power modes, the cache may remain in that mode until a second point in time labeled Cache Active when some operation or task will require this cache to be in an Active mode again. As would be understood, more or fewer low power modes are possible for a particular implementation of a cache.

As illustrated in FIG. 3A, while the cache is in the Active mode, it consumes or leaks a first amount of power (shown as mA). If the cache is placed in LPM1 it will consume or leak a second amount of power, lower than the amount of power of the Active mode. Additionally, if the cache is placed in LPM2 it will consume or leak a third amount of power, lower than the amount of power of the Active mode and LPM1. As would be understood, the power levels for Active mode, LPM1 and LPM2 shown in FIG. 3A are illustrative, and may vary from what is illustrated in FIG. 3 for different caches. As would also be understood, entering the cache into a low power mode also typically results in the cache being flushed and/or having one or more cache lines in the cache being written to another memory, such as an off-chip memory like a DDR. Bringing the cache out of the low power mode, correspondingly typically results in the cache being powered up out of the low power mode or state and/or repopulated with the cache lines present when the cache was placed in the low power mode.

As also shown in FIG. 3A, there is a time delay to both enter and exit each of LPM1 and LPM2 (also called an "entry latency" and "exit latency"), as well as an amount of power required to enter into and exit out of each of LPM1 and LPM2. The amount of time required to cause a cache to enter and exit from the low power mode, and the power "cost" or "overhead" of entering and exiting the cache from low power mode, will vary for each cache. These entry/exit latencies and entry/exit power costs can be pre-determined for each available low power mode for a cache, such as for example by testing at a manufacturer. Once determined, the entry/exit latencies and entry/exit power costs for each available low power mode do not generally change for a particular cache, and may be "hardwired" or otherwise stored on the PCD for use by an algorithm or logic making determinations whether to enter the cache into a low power mode.

In an embodiment for the exemplary cache illustrated in FIG. 3A, the entry/exit latency for LPM1 will have been previously determined, as will the entry/exit power cost for LPM1. The PCD 100 becomes aware that the cache has entered an idle state labeled at a time labeled Cache Idled in FIG. 3A. Knowing when the cache will next be required to be active again to perform some task of operation—the time labeled Cache Active—in FIG. 3A, and knowing the entry/exit latency for the cache, the PCD 100 can determine how long the cache will be able to stay in LPM1 (the cache's "residency" in LPM1) before a wake up process has to begin to bring the cache back to the Active mode.

Knowing how long the cache will be able to stay in LPM1, the power leakage (shown in mA) of the cache while in LPM1, and the entry/exit power cost for LPM1, the PCD can determine whether taking the cache to LPM1 results in any actual power savings compared to leaving the cache in Active mode for the same time period. The same determination may also be made for LPM2 if desired or as part of a selection of a "best" low power mode to enter if desired. As would be understood, in an embodiment the algorithm or logic for making these determinations about power savings for a low power mode may be the same for multiple different cache. However, the particular parameters used to make the determinations, and the results of the determinations, will vary for different caches depending on their architecture, implementations, etc.

Figure 3B:
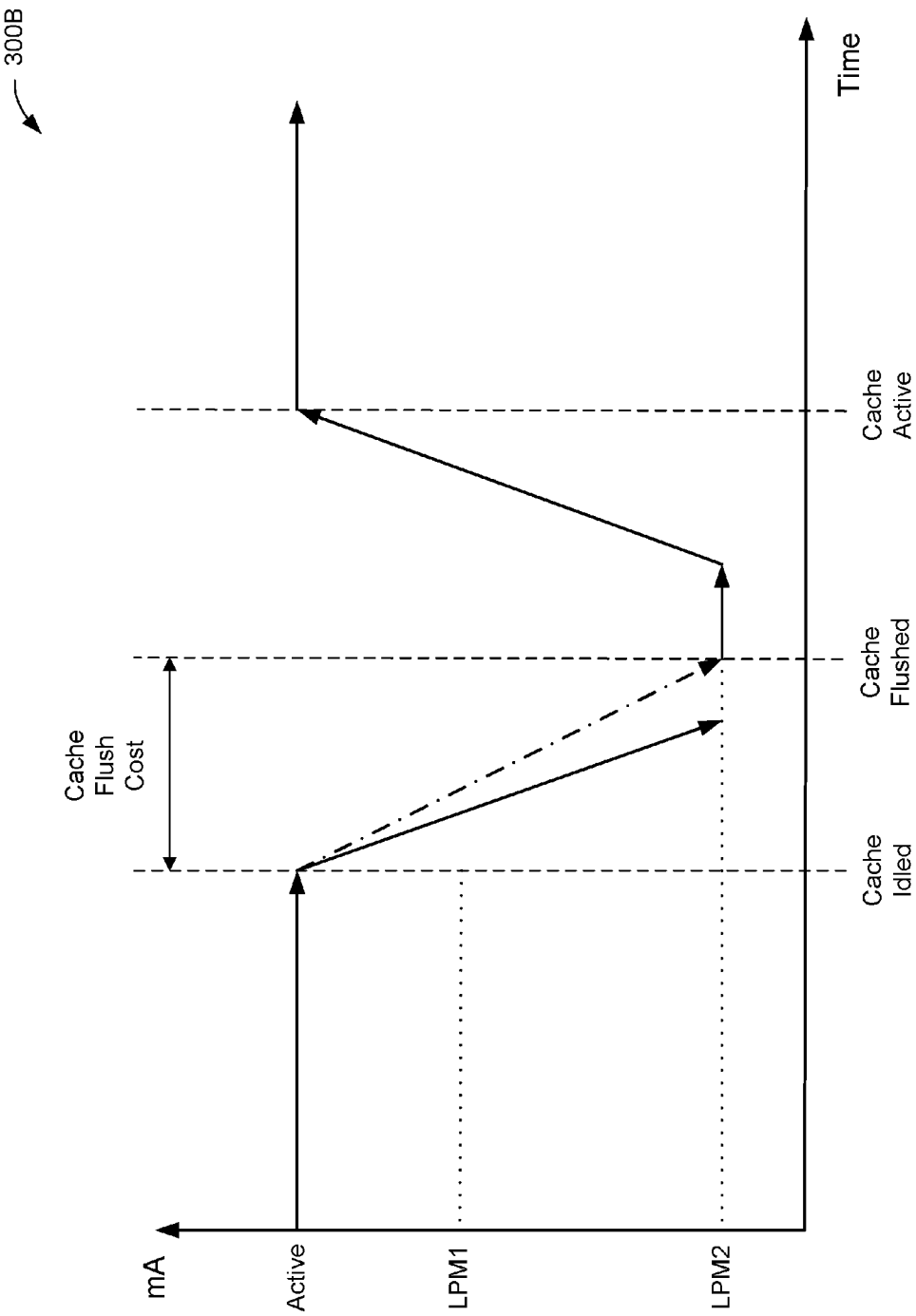
FIG. 3B is an exemplary graph illustrating additional aspects of the entry into one of the low power modes illustrated in FIG. 3A.

It has been observed that there can also be an additional latency and additional power cost incurred when entering the cache into a low power mode. FIG. 3B for example is a graph 300B illustrating additional aspects of the entering the cache from and Active mode into the LPM2 low power mode illustrated in FIG. 3A. As shown in FIG. 3B, in addition to the latency and power cost of placing the cache into LPM2, there is also a latency and power cost of flushing the cache before the cache can be placed into LPM2.

Flushing the cache may include the latency and power cost of writing the "dirty" cache lines to another memory, such as a DDR. This additional entrance latency and power cost of writing the "dirty" cache lines can vary depending on how many "dirty" cache lines are present in a cache at the time the cache is entered into the low power mode (such as LPM2 in FIG. 3B), the network or system congestion at the time the "dirty" cache lines need to be written to the other memory such as DDR, the memory pressures at the time the "dirty" cache lines need to be written, etc., that are not typically considered in the determination of whether to place the cache into LPM2. In an example where, prior to entering the idle state, the core/CPU was performing tasks or threads that required no or few fetch operations by the cache, the cache may contain few "dirty" cache lines and the additional exit latency and power cost of flushing the cache may be negligible.

In examples where, prior to entering the idle state, the core/CPU was performing tasks or threads that required many fetches by the cache, the greater number of "dirty" cache lines, as well as the current state of the network or system, the additional entrance latency and power cost of flushing the cache and writing the "dirty" cache lines to another memory may be substantial. As illustrated in the exemplary graph 300B of FIG. 3B for instance, the additional latency incurred flushing the "dirty" cache lines of the cache may effectively stall or prevent the cache from entering LPM2 at the time expected. In some instances, requiring the cache to wait in Active mode while it is being flushed may negate any benefits from placing the cache in the low power mode. Additionally in some instance, requiring the cache to wait in Active mode while it is being flushed, and the associated costs to then reactive the cache, may result in a greater power cost than if the cache had just been left in Active mode.

As would be understood, the amount or number of "dirty" cache lines as well as the network or system state when those "dirty" cache lines need to be written to another memory can vary widely at differing times. Therefore, the latency and power cost to flush a cache, and in particular to write the "dirty" cache lines to another memory before placing the cache into a low power mode or state may not be calculated using entirely predetermined parameters such as those that are typically used in low power mode algorithms, logic, drivers, controllers, etc.

Figure 4:
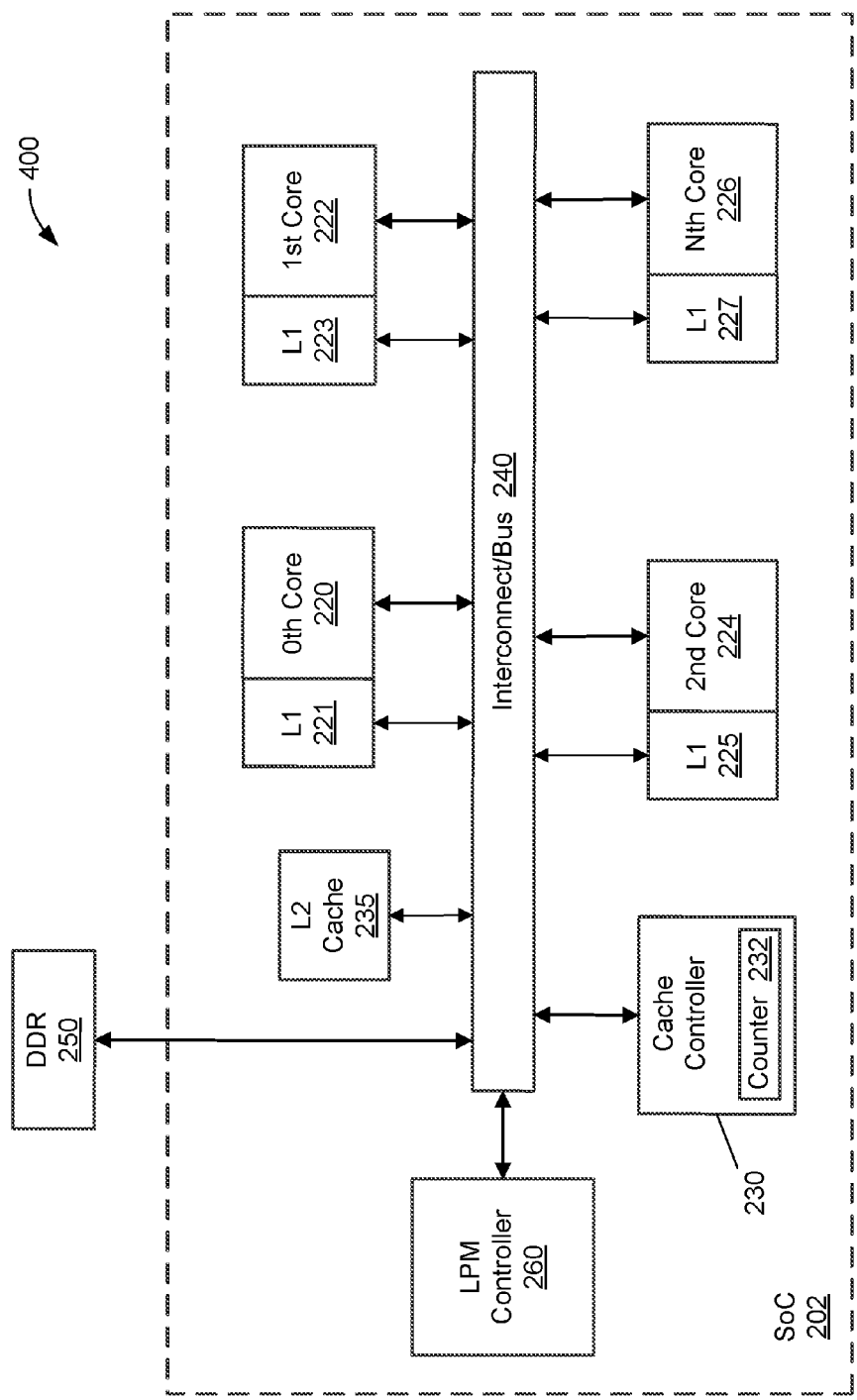
FIG. 4 is a block diagram showing an exemplary embodiment of a system for improved implementation of low power modes for caches in a PCD, such as the PCD embodiment illustrated in FIG. 1.

FIG. 4 is a block diagram showing an exemplary embodiment of a system 400 for improved implementation of low power modes for one or more caches based on the operating state in a PCD, such as the PCD embodiment illustrated in FIG. 1. The exemplary system 400 includes a system-on-a-chip (SoC) integrated circuit 202, which could be implemented in a PCD (similar to the SoC 102 in FIG. 1). The SoC 202 of FIG. 4 includes a 0th Core 220, 1st Core 222, 2nd Core 224, and Nth Core 226, all connected to an interconnect or bus 240 of the SoC 202. Each of the Cores 220, 222, 224, and 226 is coupled to an L1 cache 221, 223, 225, and 227, respectively. Each of the L1 caches 221, 223, 225, and 227 is also in communication with the interconnect/bus 240. In an embodiment, each of the L1 caches 221, 223, 225, and 227 is dedicated to the respective core to which the cache is coupled. In other embodiments, one or more of the L1 caches 221, 223, 225, and 227 may instead be shared rather than dedicated caches.

The interconnect/bus 240 of the SoC 202 may be any desired type of bus or interconnect, which may depend on the architecture of the SoC 202 and/or the uses for which the SoC 202 or PCD are intended. As illustrated in FIG. 4, an "off-chip" DDR 250 is also connected to the interconnect/bus 240 in communication with the cores 220, 222, 224, 226 and/or their respective L1 caches 221, 223, 225, 227. As will be understood, during operation one or more of the cores 220, 222, 224, 226 will write data as cache lines in the respective L1 caches 221, 223, 225, 227. For example, during operation one or more of the cores 220, 222, 224, 226 may fetch content from the DDR 250 located outside the SoC 202 as needed (or from other memories or locations outside the SoC 202), and write the fetched content as cache lines in the respective L1 cache 221, 223, 225, 227.

The SoC 202 may also include other components and/or sub-systems (including those illustrated in FIG. 1) which are not shown in FIG. 4 for clarity. Each of 0th Core 220, 1st Core 222, 2nd Core 224, and Nth Core 226 will include a processor of some type, and each may be implemented as one of the cores 120, 122, 124, 126 discussed above for FIG. 1. In some embodiments, the processor of one or more of the 0th Core 220, 1st Core 222, 2nd Core 224, and Nth Core 226 may be implemented as a general purpose processing unit, while in other embodiments the processor(s) may be implemented as a dedicated processor, such as a DSP. Each of 0th Core 220, 1st Core 222, 2nd Core 224, and Nth Core 226 also includes at least one cache memory, illustrated in the FIG. 4 as the L1 cache 221 (for 0th Core 220) L1 cache 223 (for 1st Core 222), L1 cache 225 (for 2nd Core 224), and L1 cache 227 (for Nth Core 2246.

In various embodiments, one or more of 0th Core 220, 1st Core 222, 2nd Core 224, and Nth Core 226 may include more or less components than illustrated in FIG. 2, such as one or more additional L2 cache(s) 235 that may be shared by the cores 220, 222, 224, 226 as illustrated in FIG. 4. Additionally, in some embodiments, the components illustrated in FIG. 4 may be physically arranged on the SoC 202 in varying configurations and one or more components illustrated in FIG. 4 may not be physically located near each other on the SoC 202.

As illustrated in FIG. 4, the SoC 202 includes a cache controller 230 coupled to the interconnect/bus 240 for controlling the L1 caches 221, 223, 225, 227 and/or the L2 cache 235. In an embodiment, the cache controller 230 contains or is coupled to one or more counter(s) 232 that as discussed below are used to keep track of an amount or number of "dirty" cache lines in each cache, such as L1 caches 221, 223, 225, 227 and/or L2 cache 235.

In the illustrated embodiment, a single counter 232 is implemented in the cache controller 230; however in other embodiments multiple counters may be implemented and/or the counters may be located elsewhere, such as separate counters coupled to each L1 cache 221, 223, 225, 227 and L2 cache 235. The counter 232 may be a hardware counter; while in other embodiments, the counter 232 may be hardware, firmware, software, or logic located in cache controller 232 or elsewhere.

During operation of the system 400, when a processor, such as 0th core 220 for example writes data to its L1 cache 221, the counter 232 associated with that L1 cache 221 is used to keep track of how "dirty" the cache 221 is. Exemplary information that may be recorded or tracked using the counter 232 include a number of "dirty" cache lines in the cache 221 at a given time. Each time the 0th core writes data to L1 cache 221, such as content retched from a memory or source "off-chip," the associated counter 232 is incremented, decremented, or left unchanged depending on whether the write to the L1 cache 221 causes a change in the number of "dirty" cache lines.

As a result, the counter 232 (or multiple counters in other embodiments) may keep a running count or record of the number of "dirty" cache lines in each of the L1 caches 221, 223, 225, 227 and/or L2 cache 235. In an embodiment, the running count of how many "dirty" cache lines are present in each cache may be stored in a memory of the counter 232. In other embodiments, the counters 232 may store this running count of the number of "dirty" cache lines elsewhere, such as in the respective caches like illustrated L1 caches 221, 223, 225, 227 and/or L2 cache 235. In yet other embodiments, a running count of the number of "dirty" cache lines collected by the counter 232 may be stored in a central location, such Cache Controller 232 or Low Power Mode Controller (LPM Controller 260).

Figure 5:
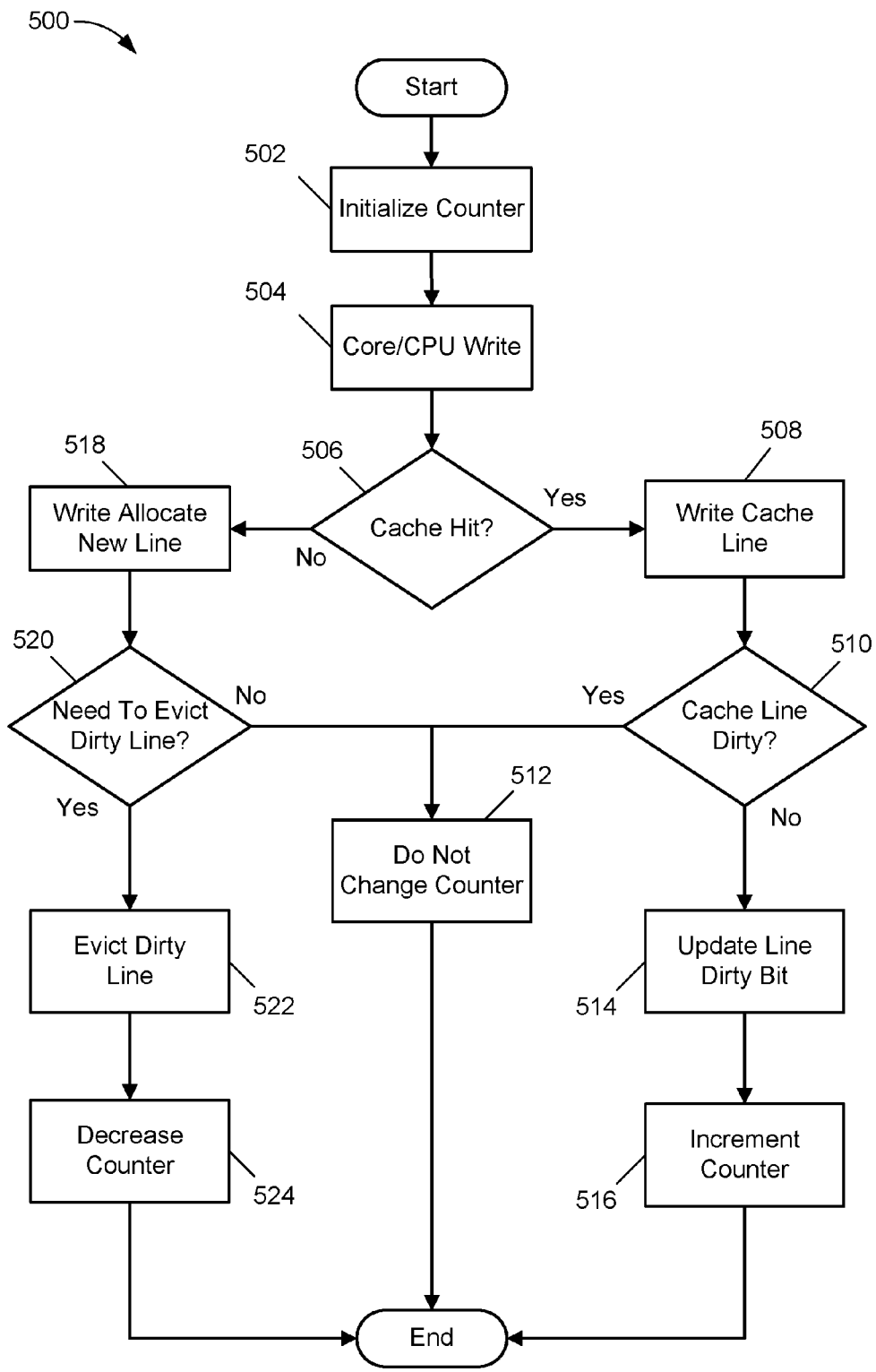
FIG. 5 is a flowchart describing aspects of an aspect of an exemplary method for determining how many "dirty" cache lines are present in a cache memory.

Turning to FIG. 5, an exemplary method 500 for tracking the number of "dirty" cache lines in a cache is illustrated. The exemplary method 500 may be implemented using one or more counters, such as counter 232 of FIG. 4 to keep a running total of a number of "dirty" cache lines in any desired cache, such as L1 caches 221, 223, 225, 227 and/or L2 cache 235 L1 caches illustrated in FIG. 4. The method 500 may be performed by logic, including software, firmware, or hardware logic in various embodiments. For example, method 500 may be performed centrally to track the number of "dirty" cache lines in a number of caches, such as by logic contained in a cache controller such as cache controller 230 of FIG. 4 or LPM 260 of FIG. 4 in communication with one or more counters such as counter 232 of FIG. 4. In other embodiments, method 500 may be performed separately for each cache, such as by logic located in the cache in communication with a counter for the cache.

Method 500 begins in block 502 where during operation the counter, such as counter 232 of FIG. 4 for a particular cache, such as L1 cache 221, is initialized to zero or some other value to reflect the number of "dirty" cache lines currently present in the L1 cache 221 at the time of initialization. This initialization may take place upon start-up of a PCD or SoC (such as SoC 202 of FIG. 4) and/or when a cache is brought from a low power mode or state into an active state. In block 504 a core or CPU, such as 0th Core 220 of FIG. 4 may perform a write operation to an address. In block 506 a determination is made whether there is a cache hit in a cache associated with the core/CPU of block 504 for the address the core/CPU is writing. This determination in block 506 may be made in an embodiment by a cache controller, such as cache controller 230 of FIG. 4.

If the determination in block 506 is that there is a hit for that address in the cache memory associated with the core/CPU, the cache line in the cache memory is overwritten by the core/CPU in block 508. A determination is made in block 510 whether that cache line of the cache memory is "dirty." As will be understood, this determination may be made in a variety of ways and may be made in an embodiment by a cache controller checking a "dirty" bit of the cache line in the cache controller. As will also be understood, although illustrated as taking place subsequent to block 508 in FIG. 5, the determination of block 510 may take place before, after, or at the same time as the actions of block 508 in various embodiments.

If the determination in block 510 is that the cache line is "dirty" —i.e. the cache line was already "dirty" prior to the core/CPU write of block 504—the method 500 continues to block 512 where no change is made to the counter. If the determination is block 510 is that the cache line is not "dirty" —i.e. the cache line was not "dirty" prior to the core/CPU write of block 504—the method continues to block 514 where the cache line is labeled as "dirty." In an embodiment, block 514 may comprise setting the "dirty" bit of the cache line in the cache memory to indicate that the cache line is "dirty." The method continues to block 516 where the counter is incremented or increased by one to indicate the new/additional "dirty" cache line in the cache memory and the method 500 ends. Again, although illustrated as taking place subsequent to block 514 in FIG. 5, the incrementing the counter of block 516 may take place before, after, or at the same time as the actions of block 514 in various embodiments.

Returning to block 506, if the determination is that there is not a hit in the cache memory for the address that the core/CPU is writing in block 504, method 500 continues to block 518 where a new cache line is write allocated for the cache memory. The write allocation of block 518 may take place in any desired manner as would be understood by one of skill in the art. Method 500 continues to block 520 where a determination is made whether the cache memory is full and/or whether a cache line has to be evicted to make room for the new cache line to be written to the cache memory. In the embodiment of FIG. 5, such eviction of a cache line if needed will result in an eviction of a "dirty" cache line, such as a least recently used "dirty" cache line.

If the determination in block 520 is that no cache line needs to be evicted—i.e. the cache memory is not full and no "dirty" cache lines will be evicted—the method 500 continues to block 512 where the counter is not changed, and the method 500 ends. If the determination in block 520 is that a cache line needs to be evicted—i.e. the cache memory is full—method 500 continues to block 522 and a "dirty" cache line, such as a least recently used "dirty" cache line, is evicted from the cache memory. The counter is then decremented or decreased by 1 to reflect the evicted "dirty" cache line in block 524 and the method 500 ends. As will be understood, although illustrated as taking place subsequent to block 522 in FIG. 5, the decrementing the counter of block 524 may take place before, after, or at the same time as the actions of block 522 in various embodiments.

Returning to FIG. 4, the system 400 also includes an exemplary LPM Controller 260 connected to the interconnect/bus 240. LPM Controller 260 may receive or fetch the running count of "dirty" cache lines from the counter 232, which may be calculated or determined for each cache in any desired manner, such as by the method 500 of FIG. 5. The LPM Controller 260 uses the amount or number of "dirty" cache lines when making determinations about placing one or more of L1 caches 221, 223, 225, 227 or L2 cache 235 into one or more low power modes and/or which low power mode to place such cache(s). For example, in an embodiment the LPM Controller 260 may comprise a centralized driver, logic, software, or algorithm, which in an implementation may be part of an operating system for the PCD 100 that makes the determinations whether to place one or more of L1 caches 221, 223, 225, 227 and/or L2 cache 235 into a low power mode and/or which low power mode to place a cache into. In another embodiment, the LPM Controller 260 may be a hardware component or collection of hardware components, on the SoC 202 for performing the low power mode determinations for one or more of these caches (or for caches located elsewhere in the PCD 100).

Figure 6:
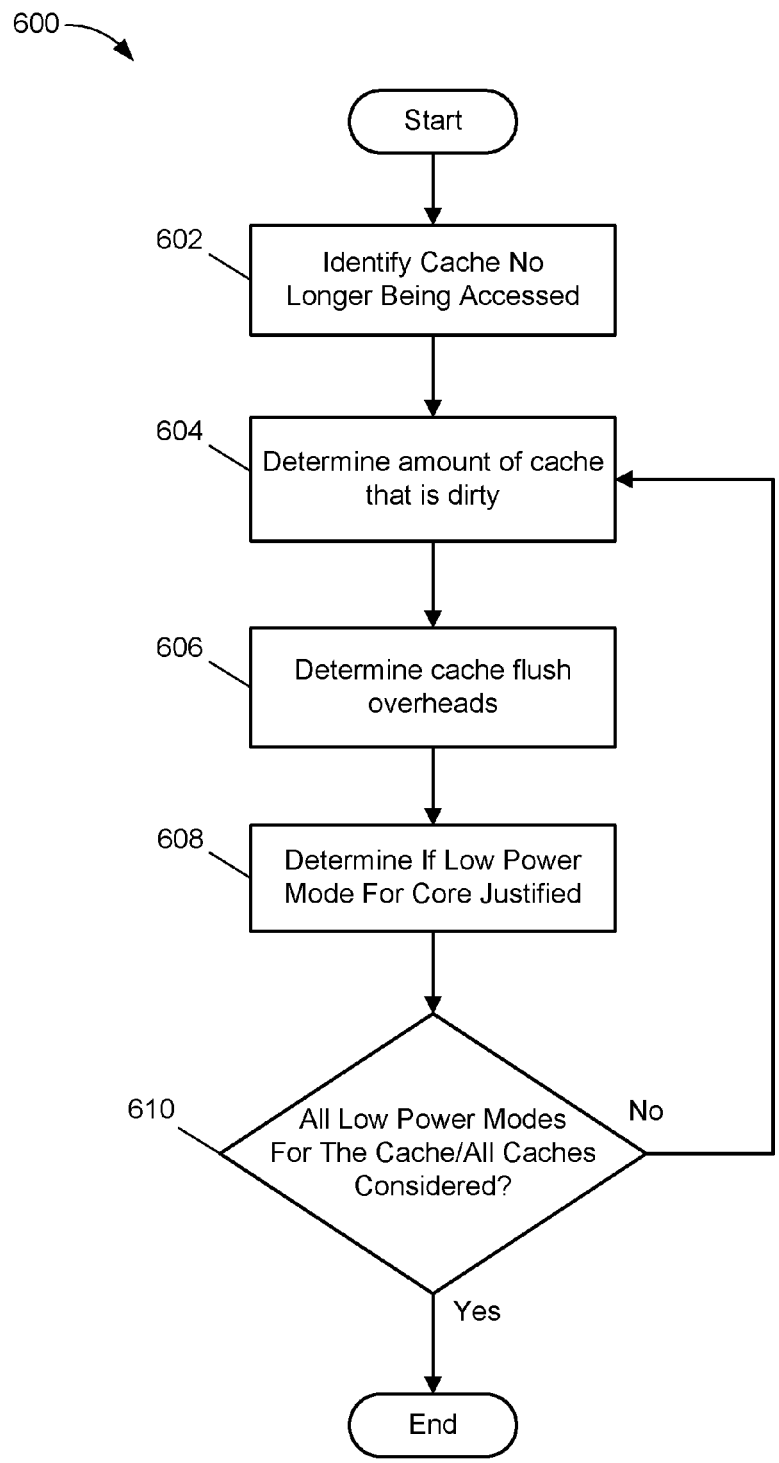
FIG. 6 is a flowchart describing an exemplary method for improved implementation of low power modes for a cache memory.

FIG. 6 is a flowchart describing an exemplary method 600 for improved implementation of low power modes for a cache memory. In an embodiment, method 600 may be performed by a controller such as LPM Controller 260 of FIG. 4 acting alone or in conjunction with other components, such as counter 232. The method 600 begins in block 602 with the identification or detection of a triggering event, such as one or more cache memories no longer being accessed. The cache memory may be one or more of L1 cache 221, 223, 225, 227 or FIG. 4 no longer being accessed by its respective core 220, 222, 224, 226. Additionally, the cache may be L2 cache 235 of FIG. 4 no longer being accessed by one or more of cores 220, 222, 224, 226 or some other component of the SoC 202.

The cache memory no longer being accessed may be identified or detected in block 602 by a component such as the LPM Controller 260 or cache controller 230 illustrated in FIG. 4 in varying embodiments. As discussed above, the LPM Controller 260 may be a separate component (or collection of components), or may be an algorithm, application, program, driver, etc., operating on the PCD 100. As would be understood, there are multiple ways to identify or determine in block 602 that one or more cache is being accessed.

Once a cache has been identified or determined as no longer being accessed in block 602, amount of the cache that is "dirty" is identified in block 604. In an embodiment, block 604 may comprise receiving or fetching a number of "dirty" cache lines for the cache memory, such as from counter 232 discussed above for FIG. 4. Based at least in part on the determination in block 604 the overhead or cost in terms of power and/or time of placing the cache into one or more low power modes or states is calculated in block 606. In some embodiments, a centralized component or driver/application/algorithm, such as LPM Controller 260 of FIG. 4, may perform block 606 for one or more cache. In some embodiments, the cache may be an L1 cache associated with the core/CPU, such as L1 cache 221, 223, 225, 227 of FIG. 4. In other embodiments, the cache may be an L2 cache 235 or other cache shared or accessible to more than one core/CPU or other component of the SoC 202.

In an embodiment the determination of block 606 may comprise a calculation or estimation for one or more low power modes the power cost of writing the number or amount of "dirty" cache lines from the cache memory to another memory such as DDR 250. The determination of block 606 may alternatively, or additionally, comprise determining for one or more low power mode a latency for storing the number of "dirty" cache lines into another memory such as DDR 250. This calculation or estimation of the latency and/or power cost may in block 606 may be performed using the number of "dirty" cache lines for the cache memory regardless of how the number was determined. For example in an implementation, the number of "dirty" cache lines may be calculated or tracked using the method 500 of FIG. 5.

In block 608, the method 600 determines if the low power mode for the core is justified. In an embodiment, the determination of block 608 is based on the calculations or determinations of blocks 604 and 606. For example, in some embodiments, block 608 may comprise comparing the power cost of keeping a cache in an active state with the power cost of placing the cache into a low power state (such as LPM2 of FIG. 3A) and the power cost of bringing the cache from the low power state.

The power cost from placing the cache into the low power state may be determined in an embodiment by first multiplying the power consumption/leakage of the cache in the low power state by the period of time the cache is "resident" in the low power state to obtain a "raw" power cost. The period of time that the cache is "resident" in the low power state may be determined based on an entry/exit latency of the cache, including the latency involved in writing the "dirty" cache lines in the cache memory into another memory. This "raw" power cost may be adjusted by an entry power cost of writing the "dirty" cache lines in the cache memory into another memory, to determine a final, total power cost of placing the core/CPU into the low power mode. As would be understood, entirely different ways of arriving at the final total power cost of placing the cache into the low power mode may be implemented in block 608.

In an embodiment, if the final total power cost of placing the cache into the low power mode is not less than the power cost of keeping the cache in a fully active mode, the low power mode is not justified. In another embodiment, the determination of block 608 may instead require that the "cost savings" from placing the cache into the low power mode exceed the power cost of the fully active mode by a pre-determined amount, percentage, or threshold for the low power mode to be justified. In an implementation, a centralized component or driver/application/algorithm, such as LPM Controller 260 of FIG. 4, may perform the determinations or calculations of block 608 for one or more cache.

After block 608, block 610 may be performed to decide whether all low power modes for the cache no longer being accessed, or for all caches no longer being accessed, have been considered. If they have been considered, the method 600 ends. If all low power modes for the cache, or for all caches, have not been considered, the method 600 returns to block 602 and begins the calculations/determinations for the next low power mode of the cache or for the next cache.

Block 610 is optional in some embodiments. For example, in an embodiment where only one low power mode exits for a cache, block 610 is unnecessary and the method 600 could end after determining whether the low power mode is justified in block 608. In other embodiments, multiple low power modes may exist for a cache, but the LPM controller 260, algorithm, logic, application, driver, etc., implementing method 600 may be structured such that all possible low power modes for the cache are evaluated sequentially, stopping when any low power mode is determined to be justified. In such embodiments the determination in block 608 that a low power mode is justified could also end the method 600.

In yet other embodiments, method 600 may evaluate all possible low power modes for a cache at the same time. In these embodiments, block 608 may further include a determination of a "best" low power mode, such as a low power mode with the greatest power cost savings over an active mode. For these embodiments, determination in block 608 of a "best" low power mode could also end the method 600.

Figure 7:
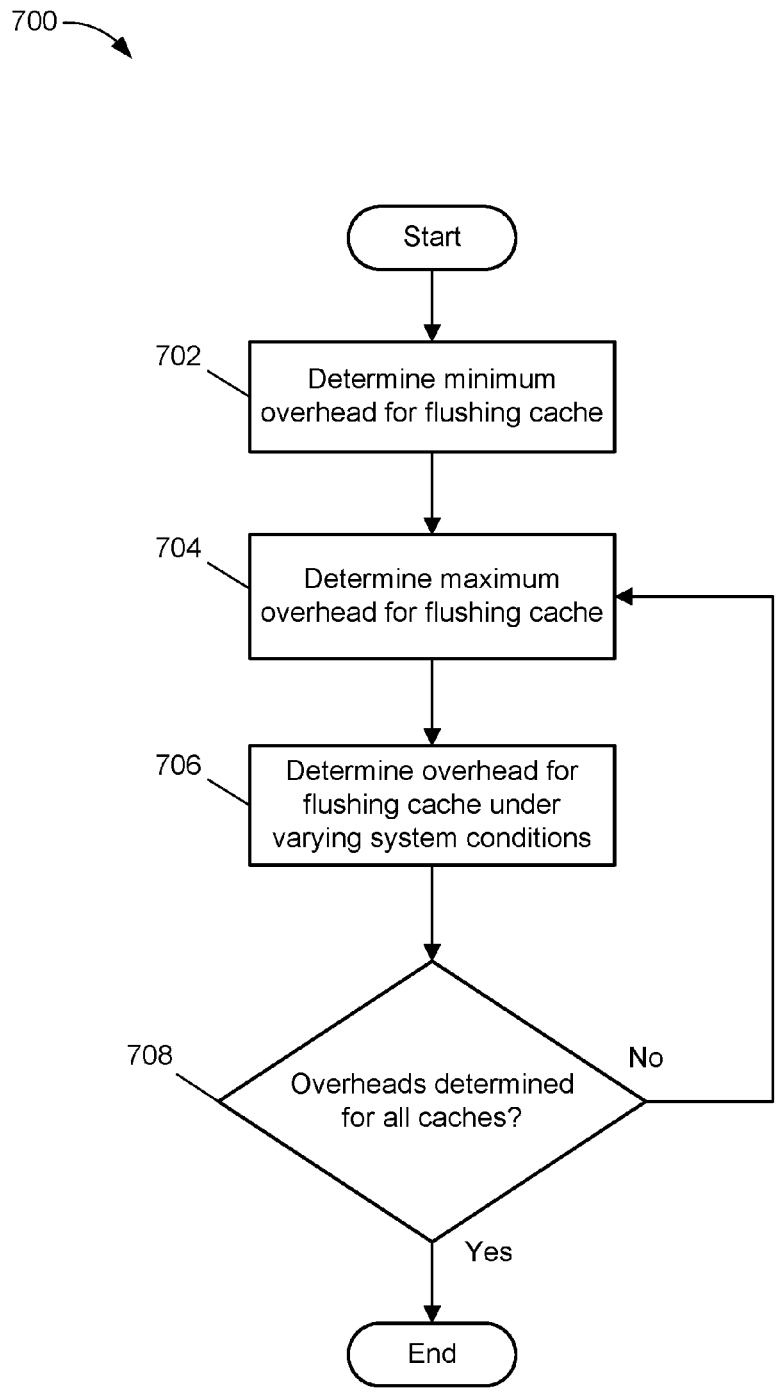
FIG. 7 is a flowchart describing additional aspects of the method a portion of the method of FIG. 6.

As will be understood, the determination of cache flush overheads in block 606 may include consideration of a variety of factors and conditions, including current system conditions. In an embodiment, baseline power and time costs/overheads for one or more cache memory under various conditions may be determined to allow more accurate determinations of the power and/or time overheads in block 606. FIG. 7 is an exemplary embodiment of a method 700 for determining or setting baselines for one or more cache memory. The method 700 may be performed by one or more of LPM controller 260 or cache controller 230, such as at start-up of the SoC 202 or PCD 100.

Method 700 begins in block 702 with determining a minimum overhead for flushing a cache memory. In an embodiment, block 702 may comprise setting a single cache line as "dirty" and determining the power and time overhead or cost of flushing the single "dirty" cache line to another memory such as DDR 250. Method 700 may also comprise determining a maximum overhead for flushing one or more cache memory in block 704. In an embodiment, block 704 may comprise setting all of the cache lines as "dirty" and determining the power and time overhead or cost of flushing the entire "dirty" cache memory to another memory such as DDR 250.

Method 700 may also include determining the overhead for flushing the cache memory under various system conditions in block 706. In an embodiment, the time and power needed to write cache lines from a cache memory to another memory such as DDR 250 may be measured when the system is congested such as when interconnect/bus 240 is experiencing high data traffic and/or measured when the system is not congested. Additionally, the time and power needed to write cache lines from a cache memory to another memory such as DDR 250 may be measured when the DDR 250 is undergoing memory pressure. As would be understood, additional measurements may be taken to determine power and/or time costs associated with writing cache lines to another memory under varying conditions of one or more component of the SoC 202 or PCD 100.

After block 706, block 708 may be performed to decide whether power and time costs or overhead baselines have been determined or measured for all cache memories. If they have been determined or measured for all cache memories, the method 700 ends. If power and time costs or overhead baselines have not been determined or measured for all cache memories, the method 700 returns to block 704 and begins measuring/determining baselines for the next cache memory. As will be understood the various baselines or parameters determined or measure during method 700 may be stored in association with the applicable cache memory. In different embodiments, the baselines or parameters may be stored centrally such as at a component like LPM controller 260 or cache controller 230 or may be stored separately at the applicable cache memory.

Once the baselines or parameters for each desired cache memory have been set, such as by the LPM 260 performing method 700 of FIG. 7, a more accurate or precise determination or estimation of the power and time overhead from flushing any number "dirty' cache lines under a variety of system or component conditions may be made. In particular, embodiments of block 606 of method 600 illustrated in FIG. 6 may take into account such baselines or parameters for a particular cache memory when determining or estimating the power and time overheads and costs for flushing the number "dirty" cache lines.

As would be understood, FIGS. 6 and 7 describe only one exemplary embodiment of the disclosed methods 600 and 700, respectively. In other embodiments, additional blocks or steps may be added to the method 600 illustrated in FIG. 6 and/or method 700 illustrated in FIG. 7. Similarly, in some embodiments various blocks or steps shown in FIGS. 6 and/or 7 may be combined or omitted. Such variations of the methods 600 and 700 are within the scope of this disclosure.

Additionally, certain steps in the processes or process flows described in this specification, including FIG. 6 or 7 may naturally precede others for the invention to function in the embodiments as described. However, the disclosure is not limited to the order of the steps described if such order or sequence does not alter the functionality of the invention. Moreover, it is recognized that some steps may performed before, after, or in parallel (substantially simultaneously) with other steps without departing from the scope of the disclosure. Further, words such as "thereafter", "then", "next", "subsequently", etc. are not intended to limit the order of the steps. These words are simply used to guide the reader through the description of the exemplary method.

The various operations, methods, or functions described above for methods 600 and 700 may be performed by various hardware and/or software component(s)/module(s). Such component(s) and/or module(s) may provide the means to perform the various described operations, methods, or functions.

One of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present invention, as defined by the following claims.

What is claimed is:

1. A method for improved implementation of low power modes in a multi-core system-on-a-chip (SoC) in a portable computing device (PCD), the method comprising:
   identifying a cache memory of the multi-core SoC not being accessed;
   determining for the identified non-accessed cache memory a number of dirty cache lines;
   determining for a low power mode of the cache memory, an entry latency of placing the cache memory into the low power mode based on the number of dirty cache lines, and an exit latency of taking the cache memory out of the low power mode, wherein determining the entry latency includes determining a time cost of writing the number of dirty cache lines to a second memory based in part on a plurality of measurements of the time cost under different levels of data traffic congestion on an interconnect used to write the dirty cache lines to the second memory;
   determining for the low power mode of the cache memory, an entry power cost of placing the cache memory into the low power mode based on the number of dirty cache lines, and an exit power cost of taking the cache memory out of the low power mode;
   determining if the low power mode for the cache memory results in a power savings over an active mode for the cache memory based at least on the entry power cost of the cache memory and the entry latency for the cache memory to enter the low power mode; and
   placing the cache memory in the low power mode in response to a determination that the low power mode for the cache memory results in a power savings over the active mode.

2. The method of claim 1, wherein determining the number of dirty cache lines for the cache memory comprises receiving from a counter the number of dirty cache lines in the cache memory.

3. The method of claim 2, wherein the counter is part of a cache controller in communication with the cache memory.

4. The method of claim 3, wherein the cache controller is configured to increment the counter when a cache line is made dirty in the cache memory and to decrement the counter when a dirty cache line is evicted from the cache memory.

5. The method of claim 1, wherein determining the entry power cost of placing the cache memory into the low power mode based on the number of dirty cache lines further comprises:
   determining an amount of power required to write the number of dirty cache lines to the second memory.

6. The method of claim 1, further comprising:
   determining for a second low power mode of the cache memory, a second entry latency of placing the cache memory into the second low power mode based on the number of dirty cache lines, and an exit latency of taking the cache memory out of the second low power mode;
   determining for the second power mode of the cache memory, a second entry power cost of placing the cache memory into the second low power mode based on the number of dirty cache lines, and an exit power cost of taking the cache memory out of the second low power mode; and
   determining if the second low power mode for the cache memory results in a power savings over the first low power mode for the cache memory based at least on the second entry power cost of the cache memory and the second entry latency for the cache memory to enter the second low power mode.

7. A computer system for a multi-core system-on-a-chip (SoC) in a portable computing device (PCD), the system comprising:
   a cache memory of the SoC;
   a low power mode controller in communication with the cache via an interconnect, the low power mode controller configured to:
     identify that the cache memory is not being accessed by any component of the SoC,
     determine for the identified non-accessed cache memory a number of dirty cache lines,
     determine for a low power mode of the cache memory, an entry latency of placing the cache memory into the low power mode based on the number of dirty cache lines, and an exit latency of taking the cache memory out of the low power mode, wherein the low power mode controller is configured to determine the entry latency in part by being configured to determine a time cost of writing the number of dirty cache lines to a second memory based in part on a plurality of measurements of the time cost under different levels of data traffic congestion on an interconnect used to write the dirty cache lines to the second memory,
     determine for the low power mode of the cache memory, an entry power cost of placing the cache memory into the low power mode based on the number of dirty cache lines, and an exit power cost of taking the cache memory out of the low power mode,
     determine if the low power mode for the cache memory results in a power savings over an active mode for the cache memory based at least on the entry power cost of the cache memory and the entry latency for the cache memory to enter the low power mode; and
     place the cache memory in the low power mode in response to a determination that the low power mode for the cache memory results in a power savings over the active mode.

8. The system of claim 7, wherein the low power mode controller is further configured to:
   determine the entry power cost of placing the cache memory into the low power mode by determining an amount of power required to write the number of dirty cache lines to the second memory.

9. The system of claim 7, wherein the low power mode controller is further configured to:
   determine for a second low power mode of the cache memory, a second entry latency of placing the cache memory into the second low power mode based on the number of dirty cache lines, and an exit latency of taking the cache memory out of the second low power mode;
   determine for the second power mode of the cache memory, a second entry power cost of placing the cache memory into the second low power mode based on the number of dirty cache lines, and an exit power cost of taking the cache memory out of the second low power mode; and
   determine if the second low power mode for the cache memory results in a power savings over the first low power mode for the cache memory based at least on the second entry power cost of the cache memory and the second entry latency for the cache memory to enter the second low power mode.

10. The system of claim 7, further comprising:
   a counter in communication with the low power mode controller, the counter configured to store the number of dirty cache lines for the cache memory.

11. The system of claim 10, further comprising a cache controller in communication with the cache memory via the interconnect, the cache controller containing the counter.

12. The system of claim 11, wherein the cache controller is configured to:
   increment the counter when a cache line is made dirty in the cache memory,
   decrement the counter when a dirty cache line is evicted from the cache memory, and
   provide the number of dirty cache lines currently in the counter in response to a request from the low power mode controller.

13. A computer program product comprising a non-transitory computer usable medium having a computer readable program code embodied therein, said computer readable program code adapted to be executed to implement a method for improved implementation of low power modes in a multi-core system-on-a-chip (SoC) in a portable computing device (PCD), the method comprising:
   identifying a cache memory of the multi-core SoC not being accessed;
   determining for the identified non-accessed cache memory a number of dirty cache lines;
   determining for a low power mode of the cache memory, an entry latency of placing the cache memory into the low power mode based on the number of dirty cache lines, and an exit latency of taking the cache memory out of the low power mode, wherein determining the entry latency includes determining a time cost of writing the number of dirty cache lines to a second memory based in part on a plurality of measurements of the time cost under different levels of data traffic congestion on an interconnect used to write the dirty cache lines to the second memory;
   determining for the low power mode of the cache memory, an entry power cost of placing the cache memory into the low power mode based on the number of dirty cache lines, and an exit power cost of taking the cache memory out of the low power mode;
   determining if the low power mode for the cache memory results in a power savings over an active mode for the cache memory based at least on the entry power cost of the cache memory and the entry latency for the cache memory to enter the low power mode; and
   placing the cache memory in the low power mode in response to a determination that the low power mode for the cache memory results in a power savings over the active mode.

14. The computer program product of claim 13, wherein determining the number of dirty cache lines for the cache memory comprises receiving from a counter the number of dirty cache lines in the cache memory.

15. The computer program product of claim 14, wherein the counter is part of a cache controller in communication with the cache memory.

16. The computer program product of claim 15, wherein the cache controller is configured to increment the counter when a cache line is made dirty in the cache memory and to decrement the counter when a dirty cache line is evicted from the cache memory.

17. The computer program product of claim 13, wherein determining the entry power cost of placing the cache memory into the low power mode based on the number of dirty cache lines further comprises:
   determining an amount of power required to write the number of dirty cache lines to the second memory.

18. A computer system for improved implementation of low power modes in a multi-core system-on-a-chip (SoC) in a portable computing device (PCD), the system comprising:
   means for identifying a cache memory of the multi-core SoC not being accessed;
   means for determining for the identified non-accessed cache memory a number of dirty cache lines;
   means for determining for a low power mode of the cache memory, an entry latency of placing the cache memory into the low power mode based on the number of dirty cache lines, and an exit latency of taking the cache memory out of the low power mode, wherein the means for determining the entry latency includes means for determining a time cost of writing the number of dirty cache lines to a second memory based in part on a plurality of measurements of the time cost under different levels of data traffic congestion on an interconnect used to write the dirty cache lines to the second memory;
   means for determining for the low power mode of the cache memory, an entry power cost of placing the cache memory into the low power mode based on the number of dirty cache lines, and an exit power cost of taking the cache memory out of the low power mode;
   means for determining if the low power mode for the cache memory results in a power savings over an active mode for the cache memory based at least on the entry power cost of the cache memory and the entry latency for the cache memory to enter the low power mode; and
   means for placing the cache memory in the low power mode in response to a determination that the low power mode for the cache memory results in a power savings over the active mode.

19. The system of claim 18, wherein the means for determining the number of dirty cache lines for the cache memory comprises:
   means for storing the number of dirty cache lines in the cache memory.

20. The system of claim 19, wherein the means for storing comprises a counter of a cache controller in communication with the cache memory.

21. The system of claim 20, wherein the cache controller is configured to increment the counter when a cache line is made dirty in the cache memory and to decrement the counter when a dirty cache line is evicted from the cache memory.

22. The system of claim 18, wherein the means for determining the entry power cost of placing the cache memory into the low power mode based on the number of dirty cache lines further comprises:
   means for determining an amount of power required to write the number of dirty cache lines to the second memory.

* * * * *